United States Patent
Kroon et al.

(10) Patent No.: US 12,069,334 B2
(45) Date of Patent: Aug. 20, 2024

(54) CHANGING VIDEO TRACKS IN IMMERSIVE VIDEOS

(71) Applicant: KONINKLIJKE PHILIPS N.V., Eindhoven (NL)

(72) Inventors: Bart Kroon, Eindhoven (NL); Bartolomeus Wilhelmus Damianus Van Geest, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/038,719

(22) PCT Filed: Dec. 3, 2021

(86) PCT No.: PCT/EP2021/084150
§ 371 (c)(1),
(2) Date: May 25, 2023

(87) PCT Pub. No.: WO2022/122580
PCT Pub. Date: Jun. 16, 2022

(65) Prior Publication Data
US 2024/0107110 A1    Mar. 28, 2024

(30) Foreign Application Priority Data
Dec. 11, 2020   (EP) .................................... 20213300

(51) Int. Cl.
*H04N 21/437* (2011.01)
*H04N 21/2343* (2011.01)
(Continued)

(52) U.S. Cl.
CPC ... *H04N 21/437* (2013.01); *H04N 21/234363* (2013.01); *H04N 21/431* (2013.01); *H04N 21/816* (2013.01)

(58) Field of Classification Search
CPC ......... H04N 21/437; H04N 21/234363; H04N 21/431; H04N 21/816; H04N 21/21805; H04N 21/234381; H04N 21/440281
See application file for complete search history.

(56) References Cited

U.S. PATENT DOCUMENTS

2019/0385352 A1   12/2019   Varekamp
2020/0021791 A1   1/2020   Hur et al.
(Continued)

FOREIGN PATENT DOCUMENTS

WO   2019183217 A1   9/2019
WO   2019195547 A1   10/2019
WO   2020008106 A1   1/2020

OTHER PUBLICATIONS

International Search Report and Written Opinion from PCT/EP2021/084150 mailed Jan. 12, 2022.
(Continued)

*Primary Examiner* — Anthony Bantamoi

(57) ABSTRACT

A method for transitioning from a first set of video tracks, VT1, to a second set of video tracks, VT2, when rendering a multi-track video, wherein each video track has a corresponding rendering priority. The method comprises receiving an instruction to transition from a first set of first video tracks VT1 to a second set of second video tracks VT2, obtaining the video tracks VT2 and, if the video tracks VT2 are different to the video tracks VT1, applying a lowering function to the rendering priority of one or more of the video tracks in the first set of video tracks VT1 and/or an increase function to the rendering priority of one or more video tracks in the second set of video tracks VT2. The lowering function and the increase function decrease and increase the rendering priority over time respectively. The rendering priority is
(Continued)

used in the determination of the weighting of a video track and/or elements of a video track used to render a multi-track video.

17 Claims, 3 Drawing Sheets

(51) Int. Cl.
*H04N 21/431* (2011.01)
*H04N 21/81* (2011.01)

(56) References Cited

U.S. PATENT DOCUMENTS

2020/0177939 A1   1/2020  Swaminathan et al.
2020/0107003 A1   4/2020  Phillips et al.

OTHER PUBLICATIONS

ISO/IEC JTC1/SC29/WG11—Working Draft of Immersive Video Jun. 6, 2020.
"HTTP Live Streaming" Wikipedia Download Apr. 12, 2013.
"High Efficiency Video Coding Tiers and Levels" Wikipedia Download Apr. 12, 2013.
Wang et al "Viewport Experience Presentation Using Sphere Region Presentation Track Grouping" MPEG Meeting Jul. 10, 2017.
"Dynamic Adaptive Streaming Over HTTP" Wikipedia Download Apr. 12, 2013.

CHANGING VIDEO TRACKS IN IMMERSIVE VIDEOS

CROSS-REFERENCE TO PRIOR APPLICATIONS

This application is the U.S. National Phase application under 35 U.S.C. § 371 of International Application No. PCT/EP2021/084150, filed on Dec. 3, 2021, which claims the benefit of EP Patent Application No. EP 20213300.5, filed on Dec. 11, 2020. These applications are hereby incorporated by reference herein.

FIELD OF THE INVENTION

The invention relates to the field of multi-track immersive videos. In particular, the invention relates to the transition between sets of video tracks in multi-track immersive videos.

BACKGROUND OF THE INVENTION

Immersive video also known as 3DoF+ or 6DoF video (with DoF for "degrees of freedom") enables a viewer within a viewing space to have a large field of view (FoV). In the case of real-world scenes, the viewing space and FoV are determined by the camera system that has been used to capture the video data. In the case of computer graphics there is more flexibility and one could for instance render a 360-degree equirectangular projection directly.

Coding and transmission of immersive video is a challenge because of the required resources. There are also practical constraints on the total bitrate, number of decoders and the total frame size that a client can decode and render. Similarly, there are practical limits to what can be uploaded from a live event, through satellite or 5G, and between cloud services, to keep broadcasting cost-effective.

It is common for modern video streaming services to adapt the stream to the client capabilities. Standards such as ISO/IEC 23009-1 MPEG Dynamic Adaptive Streaming over HTTP (MPEG-DASH), ISO/IEC 23000-19 Common Media Application Format (CMAF), and Apple's™ HTTP Live Streaming (HLS) specify how to divide the video up into small segments. Each segment is available in multiple versions, for instance at different bitrates. The client can measure an available bandwidth and CPU usage and decide to request lower or higher quality segments from the server.

The ISO/IEC 23009 MPEG Omnidirectional MediA Format (OMAF) standard (ISO/IEC 23090-2) specifies how to transmit a VR360 (3DoF) video, with profiles for DASH and CMAF. Note that VR360 is also called "3DoF" and the name "3DoF+" derives from this naming scheme by adding some parallax to VR360. Both viewport-independent and viewport-dependent modes are supported. In the latter case, the video frame is divided into tiles with each tile being a separate video track. This allows the total video frame to exceed the capabilities of common hardware video decoders.

For instance, HEVC Main 10 Level 5.2 is limited to 4K×2K frames which is below the resolution of a head-mounted display when used for a 360-degree FoV. For VR360, a resolution of 8K×4K or even 16K×8K is preferred.

A new standard (ISO/IEC 23090-12) for MPEG Immersive Video (MIV) describes how to prune and pack multi-view+depth video into multiple texture and depth atlases for coding by 2D video codecs. While this standard by itself does not include adaptive streaming, support for sub-bitstream access is included and it is expected that system aspects such as adaptive streaming will be handled in related MPEG (or non-MPEG) standards such as ISO/IEC 23090-10 Carriage of Visual Volumetric Video-based Coding Data.

The idea of sub-bitstream access is that part of the units in a bitstream can be removed resulting in a smaller bitstream that is still valid. A common form of sub-bitstream access is temporal access (i.e. lowering the frame rate) but in MIV there is also support for spatial access, which is implemented by allowing the removal of a subset of the atlases. Each atlas provides a video track and combinations of video tracks are used to render the MIV.

However, switching video tracks may cause visible artefacts because of a certain jump that would be especially visible in disocclusion zones and any non-Lambertian scene elements. For example, a change in viewports may cause a change in video tracks, which may cause artefacts due to the sudden switch.

SUMMARY OF THE INVENTION

The invention is defined by the claims.

According to examples in accordance with an aspect of the invention, there is provided a method for transitioning from a first set of video tracks, VT1, to a second set of video tracks, VT2, when rendering a multi-track video, wherein each video track has a corresponding rendering priority, the method comprising:

receiving an instruction to transition from video tracks VT1 to video tracks VT2;

obtaining the video tracks VT2; and if the video tracks VT2 are different to the video tracks VT1, applying:

a lowering function to the rendering priority of one or more of the video tracks in the first set of video tracks VT1, wherein the lowering function decreases the rendering priority over time, and/or an increase function to the rendering priority of one or more of the video tracks VT2, wherein the increase function increases the rendering priority over time, wherein the rendering priority of the one or more of the video tracks is for use in selecting a weighting of the respective video track and/or elements of the video track when rendering the multi-track video.

The method may further include the step of selecting the weighting and the rendering step using the weighting or weightings.

Immersive videos with large fields of view typically cannot fit on a single screen to be viewed by a user, thus a viewport of the video (i.e. a section of the whole video) is displayed to the user. The viewport can then change based on the user (e.g. sensors detecting the user's movement or the user moving a joystick/mouse) or on other factors (e.g. the server).

As discussed above, immersive videos can be based on several video tracks which are used to create the immersive video itself. However, when the viewport changes, it can trigger a change in the video tracks which are used to render the viewport. This change can cause visible artefacts in the video. A similar change in video tracks can also occur for other reasons, such as a change in bandwidth when streaming the multi-track video, thus reducing and possibly changing the video tracks used to render the multi-track video (e.g. in order to render the video at a lower resolution, thus reducing the required bandwidth to stream the multi-track video).

This invention is based on improving the displayed transition between video tracks. When an instruction is received to transition from one set of video tracks to another (e.g. a user moves a joystick), the new set of video tracks are obtained. If the new set of video tracks are different from the previously used video tracks, then the rendering priority is gradually lowered for some (or all) of the video tracks of the set of video tracks.

The lowering of the rendering priority is done by applying a lowering function to the rendering priority of the video tracks which gradually lowers a numerical value representative of the rendering priority over time.

By gradually lowering the rendering priority during the transition between video tracks, sudden changes in the immersive video (i.e. the MIV) are reduced and thus visible artefacts caused by the sudden changes are also reduced, thus increasing the viewing experience for a user.

Similarly (or alternatively), the rendering priority of the new video tracks VT2 can be gradually increased to the same effect. The new video tracks can also be introduced into the render gradually by gradually increasing the rendering priority with the increase function. This gradual "introduction" into the render also reduces sudden changes (e.g. sudden quality increases) which can distract a user and feel disorienting.

The rendering priority informs the weighting used by the CPU/GPU for the different video tracks used when rendering the immersive video. For example, the color of a pixel on the rendered immersive video may be based on the color of the corresponding pixels in three video tracks provided. The final color of the rendered pixel would be a combination of the color of the three pixels, each of which is weighted. The weighting of for each of the three colors typically depends, for example, on the importance of the video track from which the pixel is obtained. However, by gradually changing the rendering priority of the video track, the weighting on the pixel can also be lowered.

In general, the rendering priority will be based on the characteristics of the viewport and the video tracks (pose, field of view, etc.). When a viewer moves around a virtual scene, the viewport pose gradually changes and thus, so does the rendering priority. This invention further modifies that rendering priority in the process of switching of video tracks.

The lowering function and/or the increase function may be configured to change the rendering priority over a period of between 0.2 second and two seconds or between three frames and 60 frames, for example, five frames.

Alternatively, the lowering function and/or the increase function may be an exponential decay function. In this case, a video track could be removed when the corresponding rendering priority reaches a pre-defined value. The pre-defined value would depend on the possible range of values for the rendering priority. For example, for a range from 0-100, the pre-defined value may be 0.01, 0.1, 1 or 5, depending on the half life of the decay function. Similarly, the video track could be removed after a number of half lives have passed.

The video tracks need not be strictly "removed" (e.g. not requested from the server) when the rendering priority reaches a low value (e.g. 0, 0.1 etc.) or after some time has passed. For example, the video track could be kept whilst at a rendering priority of 0 and thus effectively not being used to render the immersive video. However, if the video tracks with low rendering priority are not removed and new video tracks are added, the computing resources required for rendering the immersive video will significantly increase.

Some video tracks may be kept for a relatively short time after, for example, the rendering priority reaches the pre-defined value.

Obtaining the video tracks VT2 may be based on requesting the video tracks VT2 from a server or receiving the video tracks VT2 from a server.

The video tracks can be requested based on the viewport wanted by the user. For example, the user may require a particular viewport of the immersive video and thus request the video tracks needed to render the wanted viewport.

Alternatively, the server may send the user a particular set of video tracks based on the desired output to the user. For example, the server may want the user to render a particular viewport and thus send the user the video tracks needed to render such a viewport.

The method may further comprise keeping one or more of the latest available frames of the multi-track video and/or of the video track VT1 for inpainting missing data of one or more of the subsequent frames when transitioning from video tracks VT1 to video tracks VT2.

Inpainting missing data in new frames based on older frames can also be used to further reduce artefacts created due to sudden changes in video tracks used to render the frames. The frames used for inpainting could be from the multi-track video rendered from the previous video tracks, or they could be frames from the video tracks themselves, depending on the change itself and which information is required for inpainting the new frames.

The method may further comprise:
  lowering the resolution of the one or more of video tracks VT1 and/or one or more of video tracks VT2;
  lowering the frame rate of the one or more of video tracks VT1 and/or one or more of video tracks VT2; and/or
  lowering the bit rate of the one or more of video tracks VT1 and/or one or more of video tracks VT2.

During the transition between sets of video tracks, it is possible that the resources used to render the multi-track video may be overwhelmed with data due to having to process data relating to the previous video tracks and data relating to the new video tracks at the same time. Thus, lowering the resolution, frame rate and/or the bit rate of the video tracks can reduce the amount of data which has to be processed during the transition in order to ensure that the transition can be fully rendered. In particular, this can ensure that the overall data streamed by a user fits in any bitrate and/or pixel-rate limitations.

The invention also provides a computer program product comprising computer program code means which, when executed on a computing device having a processing system, cause the processing system to perform all of the steps of the method defined above for transitioning from a first set of video tracks, VT1, to a second set of video tracks, VT2.

The invention also provides a client system for transitioning from a first set of video tracks, VT1, to a second set of video tracks, VT2, when rendering a multi-track video, wherein each video track has a corresponding rendering priority, the client system comprising:
  a client communications module configured to receive video tracks and the corresponding rendering priority for each video track from a server system; and
  a client processing system configured to:
    receive an instruction to transition from video tracks VT1 to video tracks VT2;
    receive the video tracks VT2 from the client communications module; and
    if the video tracks VT2 are different to the video tracks VT1, apply:

a lowering function to the rendering priority of one or more of the video tracks in the first set of video tracks VT1, wherein the lowering function decreases the rendering priority over time; and/or an increase function to the rendering priority of one or more of the video tracks VT2, wherein the increase function increases the rendering priority over time, wherein the rendering priority of the one or more of the video tracks is for use in selecting a weighting of the respective video track and/or elements of the video track when rendering the multi-track video.

The client processing system may further be configured to select the weighting and perform the rendering using the weighting or weightings.

The client processing system may be further configured to keep one or more of the latest available frames of the multi-track video for inpainting missing data of one or more of the subsequent frames when changing from video tracks VT1 to video tracks VT2.

The client processing system may be further configured to:

request a lower resolution version of one or more video tracks VT1 and/or one or more video tracks VT2 from the server system via the client communications module;

request a lower frame rate version of the one or more of video tracks VT1 and/or one or more of video tracks VT2 from the server system via the client communications module; and/or request a lower bit rate version of one or more video tracks VT1 and/or one or more video tracks VT2 from the server system via the client communications module.

The client processing system may be configured to request a lower resolution version, a lower frame rate version and/or a lower bit rate version based on the processing capabilities of the client processing system.

The invention also provides a server system for transitioning from a first set of video tracks, VT1, to a second set of video tracks, VT2, when rendering a multi-track video, wherein each video track has a corresponding rendering priority, the server system comprising:

a server communications module configured to send video tracks and the corresponding rendering priority for each video track to a client system; and a server processor system configured to:

receive an instruction to transition from video tracks VT1 to video tracks VT2;

send the video tracks VT2 via the server communications module; and if the video tracks VT2 are different to the video tracks corresponding to first viewport, VT1, send an instruction to the client system, via the server communications module, to apply:

a lowering function to the rendering priority of one or more of the video tracks in the first set of video tracks VT1, wherein the lowering function decreases the rendering priority over time; and/or apply an increase function to the rendering priority of one or more of the video tracks VT2, wherein the increase function increases the rendering priority over time, wherein the rendering priority of the one or more of the video tracks is for use in selecting a weighting of the respective video track and/or elements of the video track when rendering the multi-track video.

The server processing system may be further configured to:

send a lower resolution version of one or more video tracks VT1 and/or one or more video tracks VT2 to the client system via the server communications module;

send a lower frame rate version of the one or more of video tracks VT1 and/or one or more of video tracks VT2 to the client system via the server communications module; and/or send a lower bit rate version of one or more video tracks VT1 and/or one or more video tracks VT2 from the server to the client system via the server communications module.

The server processing system may be configured to send a lower resolution version, a lower frame rate version and/or a lower bit rate version based on the processing capabilities of a client processing system of the client system These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
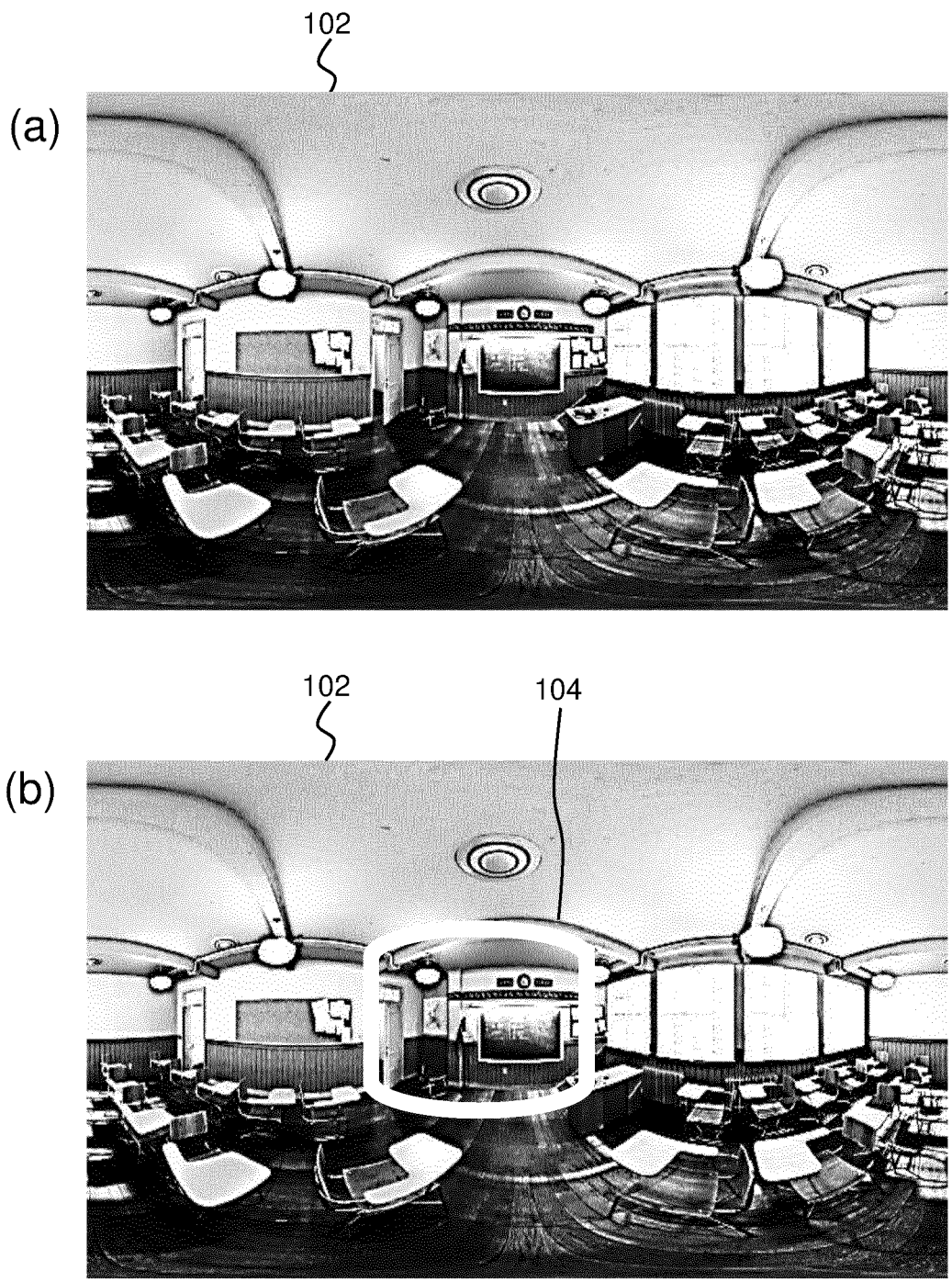
FIG. 1 shows a 2D projection of a 3D scene in 360 degrees.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for transitioning from a first set of video tracks, VT1, to a second set of video tracks, VT2, when rendering a multi-track video, wherein each video track has a corresponding rendering priority. The method comprises receiving an instruction to transition from a first set of first video tracks VT1 (hereinafter simply referred to as "video tracks VT1") to a second set of second video tracks VT2 (hereinafter simply referred to as "video tracks VT2"), obtaining the video tracks VT2 and, if the video tracks VT2 are different to the video tracks VT1, applying a lowering function to the rendering priority of one or more of the video tracks in the first set of video tracks VT1 and/or an increase function to the rendering priority of one or more video tracks in the second set of video tracks VT2. The lowering function and the increase function decrease and increase the rendering priority over time respectively. The rendering priority is used in the determination of the weighting of a video track and/or elements of a video track used to render a multi-track video.

FIG. 1 shows a 2D projection 102 of a 3D scene in 360 degrees. The 3D scene in FIG. 1 (a) is of a whole classroom. The 2D projection 102 could be a 360 degree screenshot of an immersive video of a classroom. In an immersive video, the user may be able to turn around in the classroom (e.g. VR360) and/or move around the classroom (e.g. 6DoF video) in the video.

FIG. 1 (b) shows the 2D projection 102 of the 3D scene with an exemplary viewport 104. The viewport 104 has a 90 degree field of view (approximately). The viewport 104 is the final section of the 3D scene which will be seen by the user viewing an immersive video. As the user turns and/or moves in the immersive video, the viewport 104 will change to show the section of the 3D scene which the user is facing towards.

In order for a user to be able to move in an immersive video, the 3D scene must be viewable from different positions within the 3D scene. This can be achieved by using various sensors (e.g. cameras) to create the 3D scene, where the various sensors are placed in different positions within the 3D scene. The various sensors are then grouped into so-called atlases.

Figure 2:
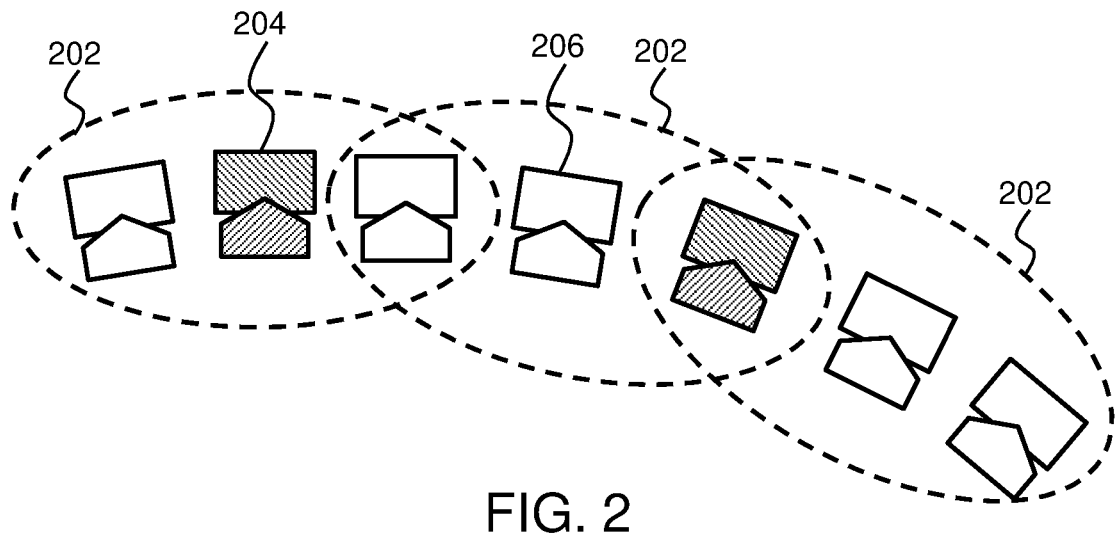
FIG. 2 shows an illustration of three atlases.

FIG. 2 shows an illustration of three atlases 202. Each atlas 202 contains one or more sensors (e.g. cameras, depth sensors etc.). In this illustration, only three atlases 202 are shown and each atlas 202 has three sensors, a main camera 204 and two additional depth sensors 206. However, the number of atlases 202, the number of sensors and the types of sensors per atlas 202 may vary based on use case.

In an alternative example, the cameras 204 could provide the complete (basic) views and the sensors 206 could provide additional views. Furthermore, the views from all of the sensors are grouped into atlases 202 whereby atlases 202 may or may not intersect.

MPEG Immersive Video (MIV) specifies a bitstream format with multiple atlases 202. Preferably, each atlas 202 has at least a geometry and texture attribute video. In the case of adaptive streaming, it is expected that each atlas 202 outputs multiple types of video data forming separate video tracks (e.g. a video track per atlas 202). Each video track is divided into short segments (e.g. in the order of a second) to allow a client to respond to a change in viewport pose 103 by changing the subset of video tracks that is requested from a server.

The atlas system contains multiple camera views and through range sensors, depth estimation or otherwise, can also create depth maps. The combination of all of these forms a video track per atlas 202 (in this case). The cameras 204 can also be registered, placing them in a common "scene" coordinate system. The output of each atlas 202 thus has a multiview+depth (or geometry) representation.

Figure 3:
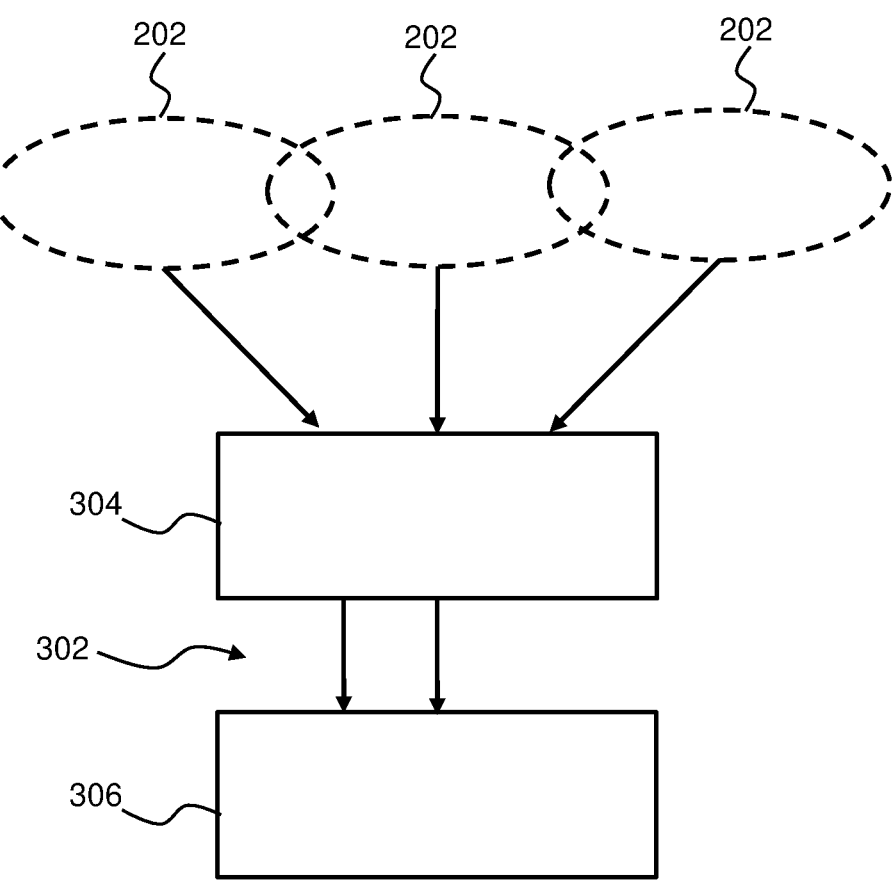
FIG. 3 shows a server system sending video tracks to a client system.

FIG. 3 shows a server system 304 sending video tracks 302 to a client system 306. The server system 304 receives an output from each one of the atlases 202 and encodes each one. In this example, the encoded output of a single atlas 202 forms a video track 302. The server system 304 then determines which video tracks 302 to send to the client system 306 (e.g. based on the viewport 104 requested by the client system 306). In FIG. 3, only two video tracks 302 are sent to the client system 306 from the three potential video tracks 302 received by the server system 304 from the atlases 202.

For streaming, the server system 304 can encode all of the outputs from each of the atlases 202. However, as it is infeasible to transmit all video tracks 302, only a subset of video tracks 302 are transmitted completely to the client system 306. Other video tracks 302 may also be partly transmitted if certain areas of a viewport 104 are not predictable by the video tracks 302 which were fully transmitted.

Each atlas 202 contains a group of views and the output of each atlas 202 is separately encoded, forming a video track 302. In FIGS. 2 and 3 it is assumed that there is only one atlas 202 per video track 302. The atlas 202 will contain the complete views and some patches (i.e. frustum slices) of the additional views. In other cases, an atlas 202 may only contain additional views or only contain the complete view and a video track 302 may be formed from the output of multiple atlases 202.

When the target viewport 104 is nearby one of the views that is present in a video track 302, then no other video tracks 302 may be needed by the client system 306. However, when the target viewport 104 is somewhat away from the source views, the client system 306 would benefit from having multiple video tracks 302.

Multiple tracks 302 can also be used to extend the field of view for viewer-dependent streaming of VR360 content. For instance, each camera may have a field of view of only 50 degrees while the entire scene could have a field of view of over 180 degrees. In that case the client system 306 may request video tracks 302 that match with the orientation of the viewer instead of having the full 180 degree scene available at full resolution.

There is a delay between the request of a video track and the delivery of the video track 302, and it may be that the viewport pose 104 has changed intermittently. Thus, the client system 306 may also perform sub-bitstream access operation to reduce resources or improve rendering quality. This does not reduce the transmitted bitrate, but it does lower CPU, GPU and memory requirements of the client system 306. Furthermore, in some cases it may improve rendering quality when video tracks 302 that are separated further from a target viewport 104 are eliminated. The requested subset of video tracks 302 is then rendered.

It is important to consider that not all rendering errors are visible to a human. For instance, when a large patch is moved by a few pixels (i.e. due to coding of depth values) this would not be visible to a human observer, while the same error would cause a large drop in an objective quality estimation such as peak signal-to-noise ratio (PSNR). In the switch of video tracks 302, problematic scene elements could suddenly be rendered differently which would cause sudden visual changes. Additionally, the human visual system is especially sensitive to motion.

Thus, the inventors proposed to gradually change the rendering priority of the visual elements in a video track 302 to reduce the visibility of these artefacts.

In general, the amount of rendering artefacts will increase when the viewport 104 position is further away from the basic view positions within a video track 302. However, it is possible to render a viewport 104 that is outside of the viewing space of a video track 302, particularly when this is needed for only a couple of video frames and thus may not be fully visible to the viewer. A sudden switch of pixel values due to a change in availability of a video tracks 302 is very noticeable to humans, thus, the gradual decrease in rendering priority allows the change to be made over a longer time period, reducing the noticeability of the change.

The rendering priority for each video track may be described as a single variable for each video track or a set of variables (e.g. different rendering priority variables for foreground, background etc.) Thus, when the rendering priority is being changed (increased/decreased), this may mean that the different variables of the rendering priority are being changed at the same rate or at different rates. For example, a set of patches output from an atlas may each have a different variable and the set of variables would thus form the rendering priority for the atlas. However, for the sake of simplicity, the rendering priority will be described as a single element in the following examples.

Figure 4:
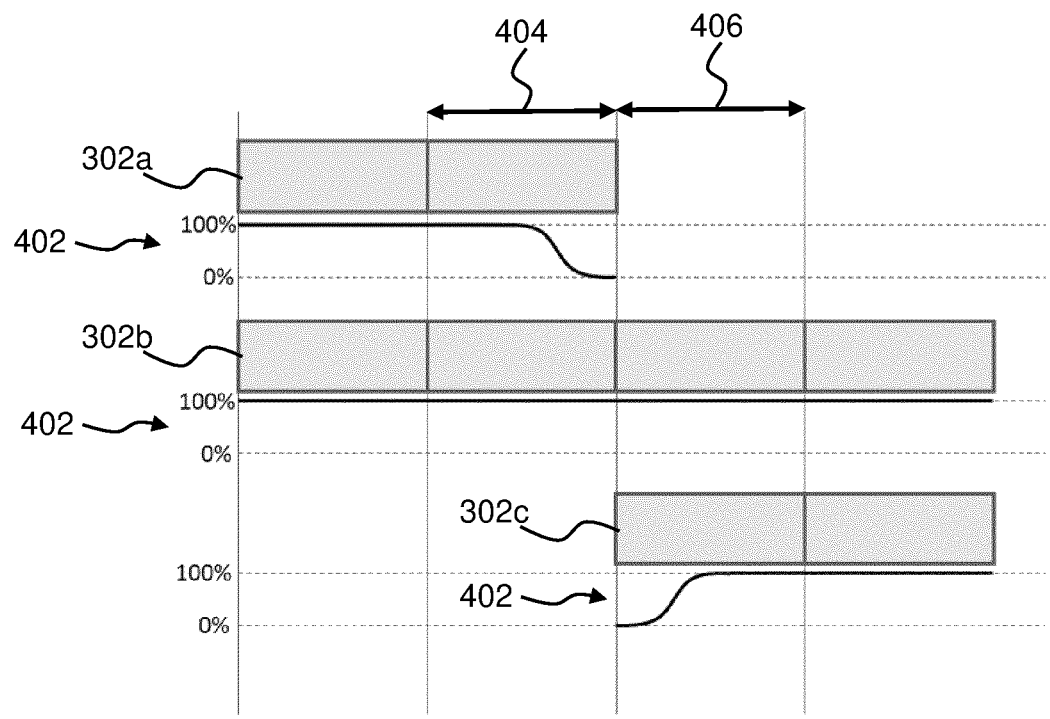
FIG. 4 shows a first example of a change of video tracks.

FIG. 4 shows a first example of a change of video tracks 302. Two video tracks 302a and 302b are initially used to render the immersive video. However, the previous video track 302a is changed to a new video track 302c between segment two 404 and segment three 406. The rendering priority 402 of the previous video track 302a is gradually lowered before the end of segment two 404 and the rendering priority 402 of the new video track 302c is gradually increased from the start of segment three 406. In this case, the video track 302b is not removed and thus is also used to render the video.

When a video track 302 has a low rendering priority 402, it will only be used when there is no other video track 302 that has the required information. When a video track 302 has zero rendering priority (i.e. 0%), it is as if the video track 302 is not there. However, when the information is missing it can be inpainted with the video track 302 with zero rendering priority 402. By gradually changing the rendering priority 402 of a video track 302, the sudden appearance, disappearance or replacement of rendering artefacts is reduced.

A gradual decrease of the rendering priority 402 is obtained by applying a lowering function to the rendering priority 402 of a video track 302 which is no longer going to be used in future segments. The lowering function gradually lowers the rendering priority 402 over, for example, 0.2-2 seconds or 5-200 frames. The lowering function may be linear, exponential, quadratic etc. The particular shape and time taken from 100% to 0% is arbitrary and may be chosen based on the particular use case. The same reasoning applies to an increase function used on the new video track 302c.

Note that, in FIG. 4, it is assumed the client 306 has knowledge of the upcoming video track 302 switch. Typically, the client 306 requests the segments of the video tracks 302. However, if the server 304 is in control of the transmitted video tracks 302, the server 304 may send a message as part of the video data (e.g. an SEI message) to inform the client 306 of the switch. Note that there is a coding disadvantage of having very short segments and thus it is conceivable that a server 304 is able to communicate with a client 306 on a sub-segment timescale.

The client 306 could also (stepwise) switch to a lower resolution version of the previous video track 302a before dropping it entirely and/or first request a low resolution version of the new video track 302c. This would allow the client 306 to keep the three video tracks 302a, 302b and 302c before switching to a high resolution and dropping the previous video track 302a. A view blending engine may take resolution into account when prioritizing video tracks 302 and, in this case, the rendering priority 402 of a downscaled video track may be further lowered. However, a sudden lowering in resolution may be visible. Thus, it may be useful to make the change gradually.

The client 306 also could (stepwise) switch to a lower frame-rate version of the previous video track 302a before dropping it entirely or first request a lowered frame-rate version of the new video track 302c. This may allow the client 306 to keep various video tracks 302 (within resource constraints for the client 306), before switching to a higher frame rate and dropping the previous video track 302a.

Figure 5:
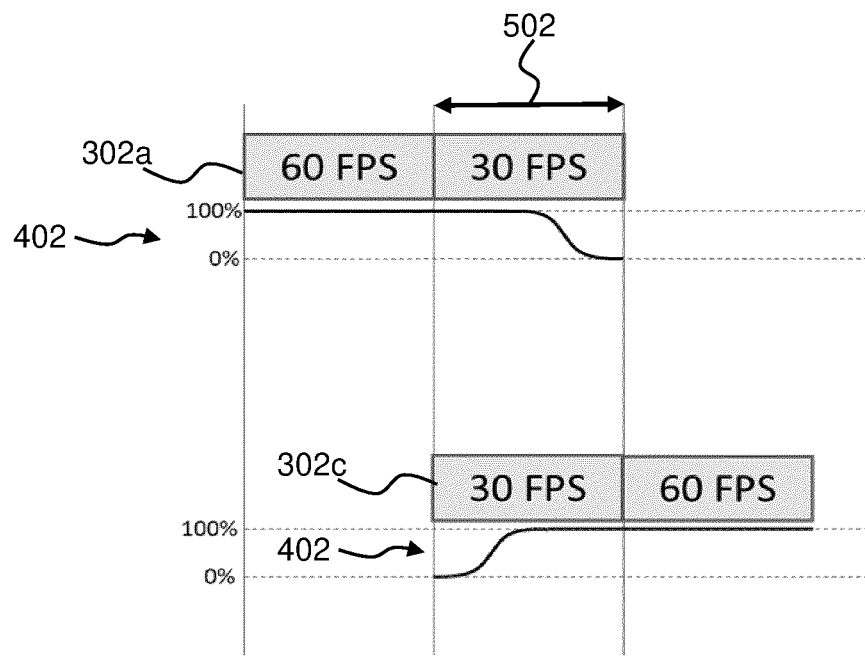
FIG. 5 shows a second example of a change of video tracks.

FIG. 5 shows a second example of a change of video tracks 302. The change in video tracks 302 can be made more gradual when receiving video data for multiple video tracks 302 by changing the rendering priority 402 for one or more of the multiple video tracks 302. However, when the client 306 receives only one video track 302, then a different strategy may be needed. In FIG. 5, the quality of the previous video track 302a is also reduced to enable simultaneous transmission of the previous video track 302a and the new video track 302c for a single segment 502. Some examples on how to halve the resources required to transmit/decode/render a video track 302 are:

Reduce the bitrate (e.g. 10 Mbps→5 Mbps),
Reduce the spatial resolution (e.g. 8K×4K→6K×3K),
Reduce the frame rate (e.g. 120 Hz→60 Hz).

In particular, FIG. 7 shows the previous video track 302a being lowered from a frame rate of 60 FPS to a frame rate of 30 FPS when the new video track 302c is introduced. The new video track 302a is also introduced with a frame rate of 30 FPS and then increased to a frame rate of 60 FPS once the previous video track 302a is removed. The rendering priority 402 of the previous video track 302a is gradually lowered and the rendering priority 402 of the new video track 302c is gradually increased during a single segment 502.

A further improvement that is especially suitable for static regions (such as backdrops) is to keep the last available frame of the video track 302 and use it for a few more frames to allow for a more gradual reduction. The last available frame of the video track 302 is then extrapolated to reflect new viewpoints. This improvement is especially useful for low latency networks where the timespan to be bridged is short. When the client 306 is capable of video frame rate conversion with motion compensation, this could be used to extrapolate the motion within the video track 302 based on the motion vectors in the last available frame.

A viewport typically depends on the viewpoint (pose, extrinsic data) and the camera characteristics (intrinsic data) such as the field of view and focal length.

The client system may also preserve the rendered viewport (frame buffer) and render from that viewport to fill in missing data in a new frame. This strategy could be enabled only when switching from video tracks 302, or by default as an inpainting strategy. The frame buffer can be rendered with an offset to compensate for viewer position changes. This is also a good fallback strategy for when (for a short moment in time and for instance due to network delays) there is no new video track 302c.

The change/transition in video tracks 302 for immersive videos refers to 3DoF videos, 3DoF+ and 6DoF videos with multiple tracks. They may also be referred to as spherical videos.

A rendering priority is, in essence, an umbrella term for one or more parameters that can be modified to change how much of a video element participates in the final render result. In other words, the rendering priority refers to one or more parameters which affect the weighting of particular video elements (e.g. pixels) during the rendering of a new image. The rendering priority may also be referred to as a final blending weight.

For example, view blending is based on a weighted sum of contributions, whereby each view has a weight (uniform or varying per pixel). Each view may be rendered into a separate buffer and the buffers may be blended based on the proximity of the viewport to each of the views. In this example, the proximity of the viewport to each of the views is used to determine the rendering priority.

Conventionally the rendering priority is based on proximity to the viewport. It is proposed to also adapt the rendering priority (i.e. increase or decrease) when the video tracks are changes. For instance, when three views [v1, v2, v3] are rendered, but for the next segment, views [v2, v3, v4] would be available, then the contribution of v1 in the weighted sum can be gradually modified towards zero. When v4 comes in, the contribution (i.e. rendering priority) may be gradually raised starting from zero.

Alternatively, it is also possible to render a depth map in the perspective of the viewport and then fetch the texture from multiple views. In this case there will also be a weighting function to decide how to blend the multiple texture contributions. Parameters which may be used to determine the rendering priority are proximity to output view and difference in depth value between rendered depth and source depth.

Other rendering solutions may render only part of the data, in which case there may be a threshold below which data is discarded. For instance, when rendering patches or blocks of a video frame, the rendering priority may be based on proximity, size of the patch, resolution of the patch, etc. It is proposed to adapt the rendering priority based on future patch availability/need.

In summary, the rendering priority may be based on proximity of source view to rendered view, differences in depth, size of patches and resolution of patches. Other methods for determining the rendering priority may be known to a skilled person.

The skilled person would be readily capable of developing a processor for carrying out any herein described method. Thus, each step of a flow chart may represent a different action performed by a processor, and may be performed by a respective module of the processing processor.

The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
   receiving an instruction to transition from a first video tracks to a second video tracks;
   obtaining the second video tracks; and
   applying a function to a rendering priority of at least one of the first video tracks if the first video tracks are different from the second video tracks,
   wherein the function decreases or increases the rendering priority over time,
   wherein the rendering priority is used to select a weighting of the at least one of the first video tracks.

2. The method of claim 1, wherein the function is arranged to change the rendering priority over a period of:
   between 0.2 second and two seconds; or
   between three frames and 60 frames.

3. The method of claim 1, wherein the obtaining is based on requesting the second video tracks from a server system, or receiving the second video tracks from a server system.

4. The method of claim 1, further comprising retaining the at least one frame of the first video tracks, wherein at least one retained frame is arranged for inpainting missing data of at least one subsequent frame when transitioning from the first video tracks to the second video tracks.

5. The method of claim 1, further comprising:
   reducing the resolution of the at least one of the first video tracks and/or the at least one of the second video tracks;
   reducing the frame rate of the at least one of the first video tracks and/or the at least one of the second video tracks; and/or
   reducing the bit rate of the at least one of the video tracks and/or the at least one of the second video tracks.

6. A computer program stored on a non-transitory medium, wherein the computer program when executed on a processor performs the method as claimed in claim 1.

7. A client apparatus comprising:
   a communications circuit,
      wherein the communications circuit is arranged to receive a plurality of video tracks,
      wherein the communications circuit is arranged to receive a rendering priority for each video track; and
   a processor circuit, wherein the processor circuit is arranged to receive an instruction to transition from a first video tracks to a second video tracks, wherein the processor circuit is arranged to receive the second video tracks from the communications circuit, wherein the processor circuit is arranged to apply a function to the rendering priority of at least one the first video tracks; if the first video tracks are different from the second video tracks, wherein the function decreases or increases the rendering priority over time, wherein the processor circuit is arranged to select a weighting of the respective video track based on the rendering priority.

8. The client apparatus of claim 7, wherein the function is arranged to change the rendering priority over a period of:
between 0.2 second and two seconds; or
between three frames and 60 frames.

9. The client apparatus of claim 7, wherein the processor circuit is arranged to retain the at least one frame of the first video tracks, wherein the retained frame is arranged for inpainting missing data of at least one subsequent frame when changing from the first video tracks to the second video tracks.

10. The client apparatus of claim 7,
wherein the processor circuit is arranged to request a lower resolution version the at least one of the first video tracks and/or the at least one of the second video tracks via the communications circuit,
wherein the request of a lower resolutions version comprises a lower frame rate version of the at least one of the first video tracks and/or the at least one of the second video tracks via the communications circuit.

11. The client apparatus of claim 10, wherein the processor circuit is arranged to request a lower resolution version, a lower frame rate version and/or a lower bit rate version based on the processing capabilities of the processor circuit.

12. A server apparatus comprising:
a communications circuit,
wherein the communications circuit is arranged to send a plurality of video tracks,
wherein the communications circuit is arranged to send a rendering priority for each video track; and
a processor circuit,
wherein the processor circuit is arranged to receive an instruction to transition from a first video tracks to a second video tracks from the client system,
wherein the processor circuit is arranged to send the second video tracks via the communications circuit to the client system,
wherein the processor circuit is arranged to send an instruction via the communications circuit if the first video tracks are different from the second video tracks,
wherein the instruction indicates a function to the rendering priority of at least one of the first video tracks,
wherein the function decreases or increases the rendering priority over time,
wherein the rendering priority of the at least one the plurality of video tracks is for selecting a weighting of the respective video track.

13. The server apparatus of claim 12, wherein the function is arranged to change the rendering priority over a period of:
between 0.2 second and two seconds; or
between three frames and 60 frames.

14. The server apparatus of claim 12,
wherein the processor circuit is arranged to send a lower resolution version of the at least one of the first video tracks and/or the at least one of the second video tracks to the client system via the communications circuit;
wherein the request for a lower resolutions version comprises sending a lower frame rate version of the one or more of the first video tracks and/or one or more of the second video tracks to the client system via the communications circuit.

15. The server apparatus of claim 14, wherein the processor circuit is arranged to send a lower resolution version, a lower frame rate version and/or a lower bit rate version based on the processing capabilities of the processor circuit.

16. The client apparatus of claim 7,
wherein the processor circuit is arranged to request a lower resolution version the at least one of the first video tracks and/or the at least one of the second video tracks via the communications circuit,
wherein the request of a lower resolutions version comprises requesting a lower bit rate version of the at least one of the first video tracks and/or the at least one of the second video tracks via the communications circuit.

17. The server apparatus of claim 12,
wherein the processor circuit is arranged to send a lower resolution version of the at least one of the first video tracks and/or the at least one of the second video tracks the client system via the communications circuit;
wherein the request of a lower resolutions version comprises sending a lower bit rate version of the at least one of first video tracks and/or the at least one of the second video tracks to the client system via the communications circuit.

* * * * *